United States Patent [11] 3,626,289

| [72] | Inventors | Neal W. Vinson;<br>Eugene P. De Rosa, both of Oakland, Calif. |
|---|---|---|
| [21] | Appl. No. | 667,755 |
| [22] | Filed | Sept. 14, 1967 |
| [45] | Patented | Dec. 7, 1971 |
| [73] | Assignee | Beckman Instruments Inc. |

[54] FRONT PANEL TRIGGER LAMPS
12 Claims, 3 Drawing Figs.

[52] U.S. Cl. .................................................... 324/96,
324/133, 340/252 R
[51] Int. Cl. ........................................................ G01r 31/00,
G01r 19/14
[50] Field of Search ........................................ 324/96,
102, 122, 76, 121, 140, 119, 28, 133; 332/9;
328/206, 57, 140, 28, 111, 112; 307/229, 290,
234, 236; 340/172, 252

[56] References Cited
UNITED STATES PATENTS

| 2,590,228 | 3/1952 | Brown | 324/28 X |
|---|---|---|---|
| 2,939,067 | 5/1960 | Wouk | 324/119 X |
| 3,086,170 | 4/1963 | Kemelhor et al. | 324/118 X |
| 3,250,989 | 5/1966 | Koda | 324/28 |
| 2,122,499 | 7/1938 | Stocker | 324/121 |
| 2,562,694 | 7/1951 | Brown | 328/28 |
| 1,859,469 | 5/1932 | Richardson | 324/96 |
| 3,191,071 | 6/1965 | King et al. | 307/229 X |
| 3,260,912 | 7/1966 | Gregory | 307/229 X |

*Primary Examiner*—Rudolph V. Rolinec
*Assistant Examiner*—Ernest F. Karlsen
*Attorneys*—Richard M. Jennings and Robert J. Steinmeyer ABSTRACT: A pair of incandescent lamps coupled to the output of a trigger circuit included in the input channel of an electronic measuring instrument. The trigger circuit is actuated by an input signal to provide a pair of complementary output signals wherein each output signal is characterized by a duty cycle which is a function of the relative amplitudes of the input signal and a threshold voltage which is applied to the trigger circuit. Each lamp is adapted to monitor one of the complementary output signals and emit visible light having a radiant intensity which is a function of the duty cycle of the output signal.

FRONT PANEL TRIGGER LAMPS

BACKGROUND

This invention relates in general to a system for measuring a desired characteristic of an input signal and more particularly to an electronic counter including visual indicating means to continuously monitor the relative amplitudes between a threshold voltage applied to a trigger circuit and the input signal so as to facilitate the setting of the threshold voltage to a level which substantially compensates for and DC component associated with the input signal.

Upon being processed through an electronic instrument, the signal, whose characteristic is to be measured, frequently includes a DC signal component which acts to offset the signal from a known reference level, such as circuit ground. This DC component may occur naturally by directly coupling an AC signal which includes a DC component to the first stages of the processing circuitry or, in the case of an AC coupled signal, may be introduced by the electronic elements associated with the input channel of the counter. Moreover, the input signal generally carries a noise signal and is accompanied by other noise signals internally generated by the various elements located throughout the input channel.

As previously mentioned, the DC component acts to offset the input signal from a desired reference. Such a component effectively translates the input signal up or down with respect to the desired reference such that the trigger circuit may be actuated by the undesired portion of the input signal waveform. For instance, if in a frequency measuring instrument the trigger circuit is set to be actuated by a given amplitude of the input signal, a DC offset of a sinusoidal input signal may permit the trigger circuit to be triggered erratically by noise, or not at all in the event that the peak amplitude fluctuates below that of the trigger level, thereby causing an appreciable error in the end measurement. Thus, adjustable compensation for the DC offset should be provided for accurate frequency measurement.

Conventionally, the effects of noise are minimized by processing the input signal through an attenuation and trigger circuit combination. A voltage source, whose output may be selectively adjusted, then acts to provide a suitable trigger voltage level at which the input signal causes the trigger circuit to generate an output pulse. To effectively compensate for the DC offset and minimize the effects of any noise, the trigger circuit is ideally adjusted to trigger on a point on the input signal close to where the slope is a maximum. In the case of sinusoidal waveforms the slope is a maximum at the "zero crossover point."

A major problem encountered in electronic measuring instruments lies in adjusting the correct trigger voltage so that the trigger circuit will operate close to the zero crossover point of the input signal. Heretofore, the trigger voltage was set by applying the input signal to the counter input channel and merely adjusting the trigger voltage until a stable count was observed on the counter display, or in the alternative, after adjusting the trigger point on the waveform at which a stable count was produced, the trigger voltage level was slowly varied until an erratic count was observed on the display and then backed off to a level somewhere between these two points. In either case the trigger level setting was at best a "rough" approximation.

SUMMARY

Briefly, the present invention contemplates means to easily determine the proper trigger voltage level setting of a trigger circuit included in an electronic counter or the like so as to effectively compensate for any DC component present in the AC signal. To this end there is provided a pair of incandescent lamps with each lamp coupled to one of the complementary output signals produced by the trigger circuit in response to the input signal. The radiant intensity of the light emitted by the lamp is a function of the duty cycle of the sensed output signal. Since the signal duty cycle is in turn a function of the amplitude difference between the AC input signal and the trigger voltage level, the operator may simply adjust the trigger setting until the radiant intensity of each lamp is substantially equal. That is to say, lamps of equal brightness manifest the condition that the duty cycles of both complementary output signals are substantially equal, which condition in turn can only result when the trigger voltage corresponds to the zero crossover point of the input signal. Thus, by simply observing the relative radiant intensities of the lamps the trigger voltage may be set to the proper level.

It is, therefore, the primary object of the present invention to provide a simple indicating means for accurately determining the correct trigger level setting.

It is a further object of the present invention to provide a visual indicator associated with a frequency counter which enables the operator to set the trigger circuit at the correct trigger voltage for any unknown signal.

A further object is to provide a visual indicator which aids in determining the correct attenuator setting.

Still another object is to provide an indicator which displays whether a positive or negative DC level is present in a DC coupled input signal.

A further object is to provide means to accurately sense the correct trigger level setting without the requirement of viewing the numerical counter display.

Other objects and advantages of this invention will become apparent from the following detailed description when read in conjunction with the accompanying drawings in which.

Figure 1:
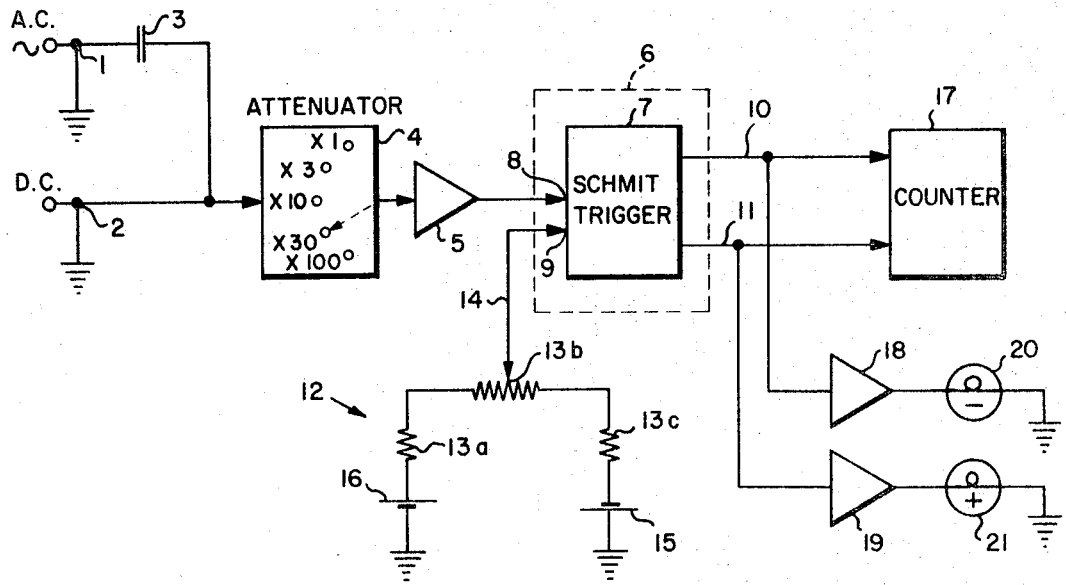
FIG. 1 is a block diagram showing the functional interconnection between the input channel of the counter and the visual indicator in accordance with the principles of the present invention.

Turning now to the drawings and more particularly to FIG. 1 thereof, it will be observed that the reference numerals 1 and 2 designate an AC coupling input terminal and a DC coupling input terminal, respectively, upon which may be impressed an input signal whose frequency is to be measured. The signal waveform applied to terminal 1 is coupled to an attenuator 4 by way of capacitor 3 which blocks the DC component of the input signal. On the other hand, an input signal applied to DC terminal 2 is fed directly to attenuator 4 and thus retains any DC component associated therewith. It will be appreciated that although, for purposes of description, the waveforms illustrated are sinusoidal in nature, the system may operate on any symmetrical waveform. For that matter, the present invention may be employed with a nonsymmetrical waveform, such as a pulsating DC signal, but not to the same degree of accuracy as with a symmetrical waveform.

Attenuator 4 generally includes five attenuation networks, each exhibiting a different attenuation factor, and a movable control knob, as depicted by the dotted line, to select the proper attenuation position. For example, the control knob is depicted at position $X_{10}$ which means that the input signal is attenuated by a factor of ten. Each network comprises a distinct resistor capacitor combination to insure equal attenuation by each network of all frequencies included in the input signal being processed.

In general, the attenuator 4 acts to translate the peak to peak amplitude excursions of the applied input signal down to within the dynamic range of the trigger voltage control means (to be described in more detail hereinafter). This enables the control means to shift the applied input signal substantially from peak to peak to permit a maximum degree of selection of a desired point on the input waveform. Simultaneously with the translation of the input signal, attenuator 4 also reduces the amplitude of a substantial portion of the noise signals to a level below that at which the trigger level setting resides so as to effectively suppress such noise from the remaining portion of the circuitry.

The signal emerging from attenuator 4 is connected to a wave-shaping circuit 6 comprising a Schmitt trigger circuit 7. The signal is impressed upon a first input 8 of the Schmitt trigger 7 by way of an impedance matching amplifier 5 which may take the form of a suitably biased field effect transistor and acts to provide an efficient impedance match between attenuator 4 and Schmitt trigger 7.

Trigger 7 cooperates with a trigger level control means (designated generally by the reference numeral 12) which provides a reference or trigger voltage level to the second input 9 of the Schmitt trigger 7. The voltage appearing at input 9 dictates the level at which the input signal will cause Schmitt trigger 7 to provide an output signal.

A suitable trigger control means 12 may include a pair of appropriate voltage sources 15 and 16, in series with a voltage divider network comprising serially connected resistors 13a, 13b and 13c. In practice, the parameters of the voltage sources and the resistors are selected so that a voltage of plus one-fourth volt appears at one end while a voltage of minus one-fourth volt appears at the other end. As a result the voltage control circuit exhibits a dynamic range of about one-half volt. Of course, other circuit parameters may be used to provide alternative control ranges.

Control circuit 12 also includes a movable contact 14, the position of which may be manually controlled by a knob (not shown). In that manner, resistor 13b cooperates with contact 14 to form an adjustable potentiometer. Varying the trigger voltage level to Schmitt trigger 7 by positioning the contact 14 shifts the input signal applied to the first input 8 either in a positive or negative direction throughout the dynamic range of control circuit 12. This permits a selection of a desired point on the signal waveform to actuate Schmitt trigger 7.

Schmitt trigger 7 provides two complementary and substantially square wave output signals on lines 10 and 11. Each output signal is characterized by a duty cycle which is a function of the relative amplitudes of the input signal and the trigger voltage impressed upon input 9 of Schmitt trigger 7 in a manner to be described in more detail in connection with the description of the operation of this embodiment.

The output signals appearing on lines 10 and 11 are simultaneously fed to a counter 17, wherein the frequency of the signal is determined and displayed by processing these signals through appropriate counting circuitry, and applied to separate incandescent lamps 20 and 21 by way of amplifiers 18 and 19, respectively. The counter may typically be an eight-digit display such as that manufactured by Beckman Instruments, Inc., designated Model No. 6,380. Lamps 20 and 21 respond to the average power of the applied signal to provide an indication of the relative duty cycles between the output signals appearing on lines 10 and 11 in order that the operator may adjust the trigger voltage to an optimum level by observing the relative radiant intensities between lamps 20 and 21.

In operation, an AC signal is applied to input terminal 1 and fed through attenuator 4 where its peak-to-peak amplitude excursions are reduced to a level compatible to that of the dynamic range of control circuit 12. Inasmuch as the signal is AC coupled to the system, it appears at the input of impedance matching amplifier 5 absent any DC component. Upon passing through amplifier 5 a small DC component may be introduced in the signal due to its inherent operating characteristics such that the signal may be displaced or offset with respect to a desired reference, such as circuit ground, with its crossover point (point of maximum slope on the waveform) effectively above or below the reference.

In order to compensate for this zero offset, movable contact 14 of control circuit 12 is adjusted until a trigger voltage level substantially equal to that of the DC component is impressed upon input 9 of Schmitt trigger 7. Under these conditions trigger 7 will not be actuated until the applied signal appearing on line 8 reaches at least the level of the DC component associated with the AC signal. Since this trigger level corresponds to the actual zero crossover point of the input signal being measured, counting errors are substantially reduced.

Figure 3:
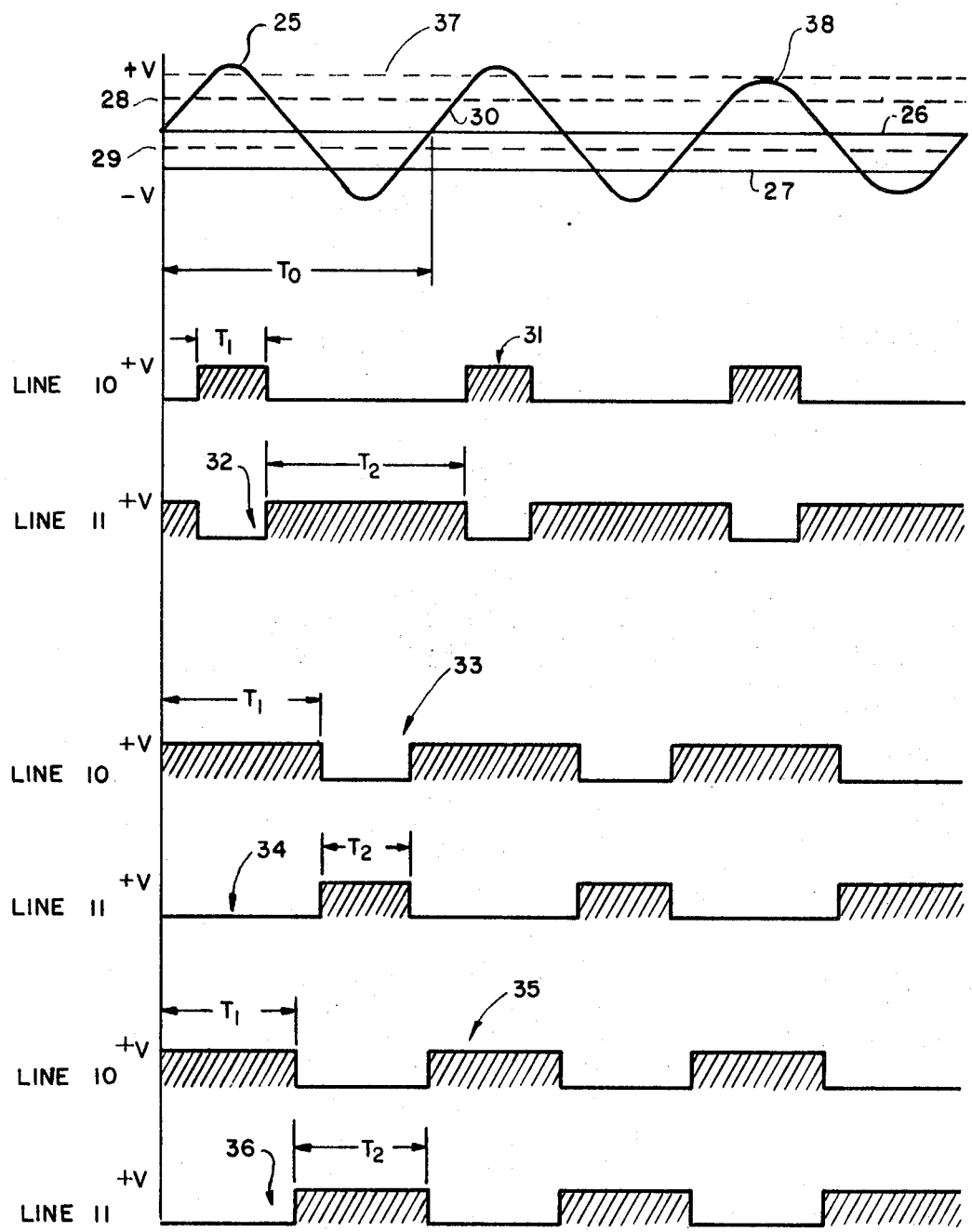
FIG. 3 is a graphical illustration of the various duty cycles of the complementary signal outputs provided by the trigger circuit in response to an input signal for trigger level settings at points below, above, and substantially corresponding to the zero crossover axis of the applied signal.

The method of determining the trigger level setting which corresponds to the zero crossover point of the input signal in accordance with the principles of the present invention will be best understood by reference to FIG. 3 which illustrates the relative duty cycles of the output signals provided by Schmitt trigger 7 at various trigger level settings.

The sign waveform 25 represents the input signal as it may appear at the input 8 of Schmitt trigger 7 with a DC component 26. As is readily apparent from an inspection of the drawing, signal 25 is characterized by a peak-to-peak amplitude excursion of one-half volt, which signal preferably falls within the dynamic range of trigger control circuit 12. The DC component 26 offsets the input signal 25 from a reference 27, such as ground. The dotted lines 28 and 29 represent two illustrative trigger level settings applied to control input 9 of Schmitt trigger 7 by means of voltage control circuit 12. Trigger level 28 is above the actual zero crossover point 30 of input signal 25 while trigger level 29 is below crossover point 30. As may be appreciated from the graphical illustration, the closer the trigger level to either the positive or negative peaks the more likely miscounts will occur due to unpredictable fluctuations of the input signal peak amplitudes. For example, should the trigger be set at a level depicted by dotted line 37, alternation 38 would not be detected by the trigger circuit.

As previously discussed, the trigger level provided by voltage control circuit 12 determines the point on the input waveform at which Schmitt trigger 7 will switch output states. In its quiescent state Schmitt trigger 7 is designed to provide a reference output, such as zero volts (ground), on output line 10 and a positive voltage +V on output line 11. Upon triggering, the signal outputs are reversed. That is, the signal appearing on line 10 rises to the +V level and the signal on line 11 falls to zero. The trigger then remains in this state so long as the voltage of the applied input signal remains above the trigger voltage level.

First, assuming that the trigger level is set at the voltage represented by dotted line 28, which is above the zero crossover point 30 of input signal 25, Schmitt trigger 7 responds to the input signal 25 to provide complementary signals on lines 10 and 11 which take the form as depicted by reference numerals 31 and 32, respectively. Thus, it will be observed that output signal 31 rises to a +V level during only a short time period $T_1$ with respect to the period $T_0$ of each input signal cycle. On the other hand, output signal 32, which is a complement of signal 31, remains at a +V level a considerable longer portion of the period $T_0$, as illustrated by the interval $T_2$. In other words, output signal 31 has a duty cycle (+V level) less than 50 percent of the period $T_0$ while output signal 32 has a duty cycle greater than 50 percent of the period $T_0$ when the trigger level is set above the zero crossover point 30.

As the trigger level voltage to input 8 of Schmitt trigger 7 is adjusted, the complementary duty cycles of the output signals 31 and 32 are varied. This is illustrated by the output signals 33 and 34 which are generated when the trigger voltage is set at a level designated by dotted line 29, which is below the zero crossover point 30. Now the output signal appearing on line 10 is characterized by a duty cycle greater than 50 percent while the output signal appearing on line 11 is characterized by a duty cycle of less than 50 percent. Thus, it may be readily appreciated from a comparison of the waveforms 31, 32, 33 and 34 that the duty cycle of each output signal provided by Schmitt trigger 7 is a function of the trigger level setting provided by the control circuit 12.

Incandescent lamps 20 and 21 which are coupled to output lines 10 and 11 by amplifiers 18 and 19, respectively, respond to provide a visual indication of the relative duty cycles of each signal and consequently an indication of the trigger level setting with respect to the zero crossover point of the input signal whose frequency or other characteristic is being measured because the radiant intensity or brightness of each lamp is a function of the average power of the signal applied to the lamp, which power is in turn directly proportional to the duty cycle of the applied signal. This may be more clearly seen with reference to output signals 31 and 32 illustrated in FIG. 3. Since the average power is defined as the peak power divided by the total power, it is obvious that lamp 21 which responds to signal 32 will emit light having a greater radiant intensity than lamp 20 which responds to signal 31. That is, signal 32 remains at a high level (+V) a greater portion of each period $T_o$ than signal 31 and accordingly is characterized by a greater average power level.

Lamp 21 carries a positive symbol (+) on its face to indicate that the trigger level setting is above the zero crossover point of the input signal when lamp 21 is brighter than lamp 22. Similarly, lamp 20 carries a negative symbol (−). To adjust the trigger voltage to a positive or negative, or zero level, the operator merely adjusts the movable arm 14 to produce a brighter light from lamp 21 for "positive," a brighter light from lamp 20 for "negative," and light of equal brightness from both lamps for "zero." It follows that by observing the relative radiant intensities of lamps 20 and 21 the operator can easily ascertain when the trigger level setting is at its optimum value, that is zero, which corresponds to the zero crossover point of the input signal. This reflects the optimum condition for signal frequency or other measurement which is when the duty cycles of both output signals from Schmitt trigger 7 are substantially equal.

In addition to providing an indication of the correct trigger level setting, lamps 20 and 21 may be used to provide an indication of the correct attenuation factor. If the attenuation factor is set too low the lamps will either not glow at all or will glow so weakly that contrast between the two can not be ascertained as the trigger control circuit 12 is varied over its dynamic range. On the other hand, if the attenuating factor is set too high the lamps will both remain bright throughout the entire range of the trigger control 12. Correct attenuation setting is achieved when a potentiometer adjustment of approximately 25 percent or less over the total dynamic range of control circuit 12 results in a variance of lamp brightness. In other words, a discernible variance in the relative radiant intensities of lamps 20 and 21 should be observed by the operator as the trigger voltage level is adjusted.

Figure 2:
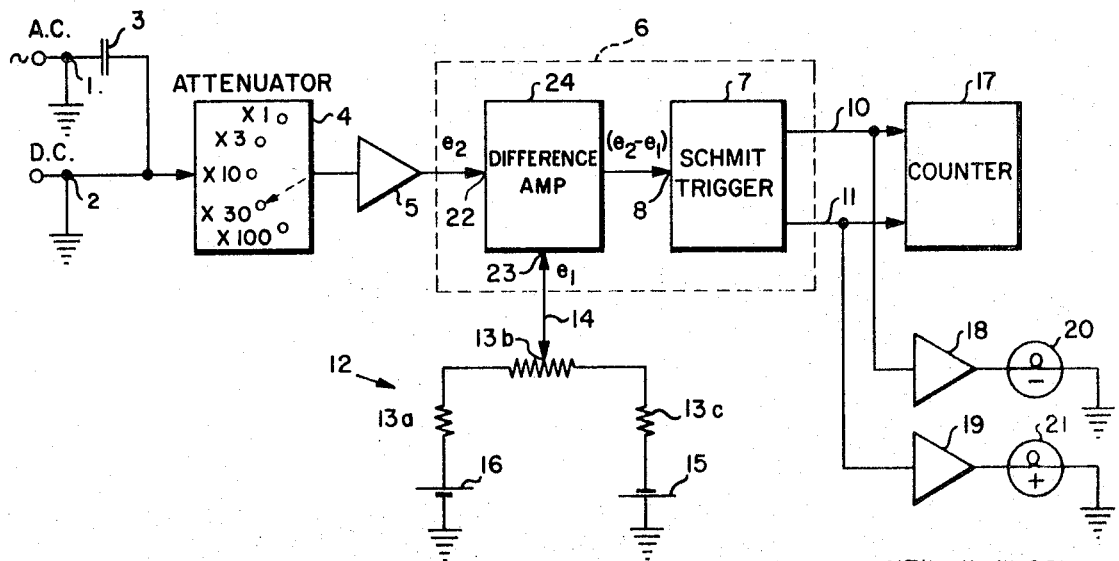
FIG. 2 is a block diagram of an alternative embodiment of the present invention.

FIG. 2 illustrates an alternative embodiment of the present invention similar to the embodiment described with reference to FIG. 1. For convenience, like reference numerals have been used to identify like components in both embodiments, some of which are an attenuator 4 connected to an impedance matching amplifier 5, a reference voltage control circuit 12, a Schmitt trigger 7, a counter 17, and incandescent lamps 20 and 21 responsive to the complementary output signals of trigger 7. The main difference is a differential amplifier 24 interposed between Schmitt trigger 7 and impedance matching amplifier 5 with the voltage output ($e_1$) of control circuit 12 being applied to one input 23 of differential amplifier 24 instead of to trigger 7, as shown in FIG. 1. The signal output provided by differential amplifier 24 is a function of the difference between the input signal ($e_2$) impressed upon a second input terminal 22 of difference amplifier 24 and the voltage ($e_1$) applied to terminal 23. This output signal in turn is fed directly to the input 8 of Schmitt trigger 7 which, like the Schmitt trigger described in connection with FIG. 1, responds to the input signal to provide a pair of substantially square wave complementary output signals on output lines 10 and 11.

In operation, the operator merely observes the relative radiant intensities of light emitted by lamps 20 and 21 as with the embodiment of FIG. 1 and adjusts the movable contact 14 to vary the reference voltage ($e_1$) applied to differential amplifier 24 until the lamps 20 and 21 emit light of substantially equal radiant intensity.

Numerous modifications and departures from the specific apparatus described herein may be made by those skilled in the art without departing from the inventive concept of the invention. For example, in place of Schmitt trigger 7 there may be provided an overdriven Class A amplifier having an inverter inserted in one of two output lines leading from the amplifier. Also, any desirable type of indicating device may be used in place of visual lamps 20 and 21. Accordingly, the invention is to be construed as limited only by the spirit and scope of the appended claims.

What is claimed is:

1. In an electronic counter including a trigger circuit responsive to an input signal for providing a pair of complementary output signals, an accumulator means connected to said trigger circuit and responsive to one of said complementary output signals, and display means associated with the accumulator means to display the number in the accumulator, the improvement comprising: lamp indicating means responsive to the complementary output signals to provide a visual indication of the relative duty cycles of the output signals.

2. In an electronic counter as claimed in claim 1 wherein said lamp indicating means comprises at least one incandescent lamp responsive to one of said complementary output signals for emitting visible light whose brightness is a function of the duty cycle of that output signal.

3. In an electronic counter including first means responsive to an input signal for providing first and second complementary output signals, an accumulator means connected to said first means and responsive to one of said complementary output signals, and display means associated with the accumulator means to display the number in the accumulator, the improvement comprising: a first incandescent lamp responsive to said first output signal for emitting visible light whose brightness is a function of the duty cycle of said first output signal, a second incandescent lamp responsive to said second output signal for emitting visible light whose brightness is a function of the duty cycle of said second output signal, and means for varying the duty cycle of each output signal until the brightness of the light emitted by said first and second lamps, respectively, is substantially equal.

4. In an electronic counter including trigger circuit means responsive to an input signal for providing first and second complementary output signals at first and second output terminals, respectively, an accumulator means connected to said trigger circuit means and responsive to one of said complementary output signals, and display means coupled to the accumulator means to display the number in the accumulator, the improvement comprising: a first lamp coupled to the first output terminal and responsive to the first output signal for emitting visible radiation whose radiant intensity is a function of the duty cycle of the first output signal and a second lamp coupled to the second output terminal and responsive to the second output signal for emitting visible radiation whose radiant intensity is a function of the duty cycle of the second output signal.

5. In an electronic counter as defined in claim 4 comprising in addition: means for varying the duty cycle of each output signal until each lamp emits visible radiation of equal radiant intensity whereby the duty cycles of said first and second output signals are also equal.

6. In an electronic counter as defined in claim 4 wherein said first and second lamps comprise incandescent lamps.

7. An electronic measuring instrument including a system for facilitating the setting of the level of a reference voltage to substantially compensate for any DC offset voltage present in a varying input signal whose characteristics are being monitored comprising:

a reference voltage source;

circuit means having a first input terminal upon which the input signal is impressed and a second input terminal connected to said reference voltage source for providing a pair of complementary output signals, each output signal having a duty cycle as a function of the relative amplitude between the input signal and the reference voltage;

first and second lamps connected to said circuit means, each lamp being responsive to one of the complementary output signals for emitting visible light having a brightness as a function of the duty cycle of that output signal; and means for adjusting the level of the reference voltage until the brightness of the light emitted by each lamp is substantially equal whereby the duty cycle of one of said output signals is then substantially equal to the duty cycle of the other of said output signals.

8. In an electronic measuring instrument as claimed in claim 6 wherein said first and second lamps comprise incandescent lamps.

9. An electronic measuring instrument as defined in claim 7 wherein said circuit means comprises a trigger circuit.

10 An electronic measuring instrument as defined in claim wherein said circuit means comprises a difference amplifier responsive to the input signal and the reference voltage to provide an output signal having an amplitude characteristic proportional to the difference between the input signal and the reference voltage and a trigger circuit connected to said difference amplifier to provide a pair of complementary output signals, each output signal having a duty cycle as a function of the relative amplitude levels of the input signal and the reference voltage.

11. An electronic measuring instrument as defined in claim 7 wherein said adjusting means comprises a potentiometer.

12. A method of setting the trigger level of a trigger circuit so that it provides a pair of complementary and equal duty cycle signal outputs in response to a varying input signal comprising the steps of:

applying the input signal to one input of the trigger circuit and a reference voltage signal to a second input of the trigger circuit, said trigger circuit being responsive to the applied signals for providing a pair of complementary output signals with each output signal having a duty cycle as a function of the relative amplitude levels between the input signal and the reference voltage;

simultaneously monitoring both output signals by a pair of incandescent lamps, each lamp being responsive to one of the output signals to emit visible light having a brightness which is a function of the duty cycle of the output signal; and adjusting the magnitude of the reference voltage being applied to the trigger circuit until each lamp emits visible light of substantially equal brightness.

* * * * *